US011453110B2

(12) United States Patent
Osawa et al.

(10) Patent No.: US 11,453,110 B2
(45) Date of Patent: Sep. 27, 2022

(54) ELECTRIC POWER WORK DEVICE

(71) Applicant: Yamabiko Corporation, Tokyo (JP)

(72) Inventors: Hisato Osawa, Tokyo (JP); Kenji Nakano, Tokyo (JP)

(73) Assignee: YAMABIKO CORPORATION, Tokyo (JP)

( * ) Notice: Subject to any disclaimer, the term of this patent is extended or adjusted under 35 U.S.C. 154(b) by 281 days.

(21) Appl. No.: 16/826,779

(22) Filed: Mar. 23, 2020

(65) Prior Publication Data
US 2020/0306948 A1 Oct. 1, 2020

(30) Foreign Application Priority Data

Mar. 26, 2019 (JP) .............................. JP2019-058011

(51) Int. Cl.
| B25F 5/02 | (2006.01) |
| B27B 17/00 | (2006.01) |
| B27B 17/02 | (2006.01) |
| B27B 17/08 | (2006.01) |

(52) U.S. Cl.
CPC ............ *B25F 5/02* (2013.01); *B27B 17/0008* (2013.01); *B27B 17/02* (2013.01); *B27B 17/08* (2013.01)

(58) Field of Classification Search
CPC ......... B25F 5/02; B27B 17/008; B27B 17/02; B27B 17/08
See application file for complete search history.

(56) References Cited

U.S. PATENT DOCUMENTS

| 8,833,221 | B2 | 9/2014 | Tomita et al. | |
| 8,935,856 | B2* | 1/2015 | Tsuruoka | B27B 17/00 30/381 |
| 10,328,600 | B2* | 6/2019 | Kachi | B25F 5/02 |
| 11,044,853 | B2* | 6/2021 | Kamiya | A01G 3/053 |
| 11,189,437 | B2* | 11/2021 | Blatz | H01H 3/20 |
| 2011/0078910 | A1* | 4/2011 | Tomita | B27B 17/083 173/217 |
| 2013/0277081 | A1* | 10/2013 | Hayashi | B25F 5/02 173/217 |

(Continued)

FOREIGN PATENT DOCUMENTS

| DE | 202015006171 U1 | 12/2015 |
| EP | 2952306 A1 | 12/2015 |

(Continued)

OTHER PUBLICATIONS

Communication pursuant to Article 94(3) EPC dated Feb. 22, 2022.

*Primary Examiner* — Nathaniel C Chukwurah
*Assistant Examiner* — Lucas E. A. Palmer
(74) *Attorney, Agent, or Firm* — CRGO Global; Steven M. Greenberg

(57) ABSTRACT

Provided is an electric power work device which includes: a body case; a work tool protruding forward from a front side with respect to the body case; a motor; and a battery supplying power to the motor. The motor is accommodated in the body case and the battery is detachably attached to a rear side with respect to the body case. A top handle is extended in a longitudinal direction at an upside with respect to the body case. The top handle includes, on an upper surface of a front part thereof, a thumb rest and a power switch. The power switch is arranged on a side in a lateral direction of the thumb rest.

5 Claims, 4 Drawing Sheets

(56) References Cited

U.S. PATENT DOCUMENTS

| | | | | |
|---|---|---|---|---|
| 2014/0190713 A1* | 7/2014 | Martinsson | ......... | B23Q 17/007 |
| | | | | 30/381 |
| 2018/0200917 A1 | 7/2018 | Kachi et al. | | |
| 2019/0111582 A1* | 4/2019 | Suzuki | ................... | B27B 17/08 |
| 2019/0217496 A1* | 7/2019 | Shibata | ............... | B23D 57/023 |
| 2020/0282590 A1 | 9/2020 | Kachi et al. | | |
| 2020/0306847 A1* | 10/2020 | Osawa | ............... | B27B 17/0008 |

FOREIGN PATENT DOCUMENTS

| | | |
|---|---|---|
| JP | 5462575 | 1/2014 |
| WO | WO2013/032374 A1 | 3/2013 |
| WO | WO-2017010408 A1 | 1/2019 |

\* cited by examiner

ELECTRIC POWER WORK DEVICE

CROSS-REFERENCE TO RELATED APPLICATION

The present application claims the benefit of priority to Japanese Patent Application No. 2019-058011 filed on Mar. 26, 2019, the disclosures of all of which are hereby incorporated by reference in their entireties.

TECHNICAL FIELD

The present invention relates to an electric power work device.

BACKGROUND OF THE INVENTION

There is a conventional electric chain saw including a body case having a motor therein, a battery mounted in a rear end part of the body case, and a top handle formed on an upper part of the body case (see Japanese Patent No. 5462575 and WO2013/032374A, for example). Such a chain saw is allowed to have a larger battery than a case where a battery is accommodated in the body case.

The chain saw disclosed in Japanese Patent No. 5462575 described above is configured such that a power switch is switched on/off every time a hand guard attached to a front part of the body case is tilted. When the power switch is on, the motor is driven, and when the power switch is off, the motor is stopped.

Further, the chain saw described in WO2013/032374A includes a power switch arranged on a front side of a gripping part of the top handle.

When an operator works with the conventional chain saw as disclosed in Japanese Patent No. 5462575, the operator is required to hold the top handle with the right hand and to hold a side handle with the left hand. In the conventional chain saw, the operator is required to take the left hand off the side handle to manipulate the hand guard so as to switch on/off the power switch during operation. Therefore, it is difficult for the operator to manipulate the power switch during operation.

Further, in the conventional chain saw as described in WO2013/032374A, there is no space for placing the pad of the thumb on the front side of the gripping part, so that, when the operator grips the top handle, the operator is required to put the tip of the thumb under the top handle. When the top handle is gripped in this way, the chain saw is less secured to cause a problem of poor working efficiency.

The present invention intends to provide an electric power work device to solve the above-described problems, which allows an operator to stably grip a top handle and to manipulate a power switch while the operator holds the body case with both hands so that the operator can work smoothly.

SUMMARY OF THE INVENTION

An aspect of the present invention is to provide an electric power work device including: a body case; a work tool protruding forward from a front side with respect to the body case; a motor driving the work tool; and a battery supplying power to the motor. The motor is accommodated in the body case and the battery is detachably attached to a rear side with respect to the body case. A top handle is extended in a longitudinal direction at an upside with respect to the body case. The top handle includes, on an upper surface of a front part thereof, a thumb rest and a power switch which drives the motor in an on-state and stops the motor in an off-state. The power switch is arranged on a side in a lateral direction of the thumb rest.

With the electric power work device of the present invention, when the operator grips a gripping part, the pad of the thumb is placed on the thumb rest so that the operator can stably grip the top handle.

Further, with the electric power work device of the present invention, the operator can switch on/off the power switch with the thumb while gripping the top handle. Therefore, after the operator turns off the power switch to stop the motor while gripping the top handle during operation, the operator can turn on the power switch while gripping the top handle, to promptly resume the operation.

As described above, with the electric power work device of the present invention, the operator can stably grip the top handle and can switch on/off the power switch while holding the electric power work device with both hands. Accordingly, the operator can work smoothly, and working efficiency is improved.

Further, the thumb rest is arranged near the power switch. Therefore, even if the operator turns off the power switch by mistake during operation, the operator can easily turn on the power switch again while gripping the top handle.

Still further, in the electric power work device of the present invention, the power switch is arranged on a side of the thumb rest so that the length in the longitudinal direction of the top handle is decreased.

DETAILED DESCRIPTION OF THE PREFERRED EMBODIMENTS

A description will be given of an example of an embodiment of the present invention in detail, with reference to the drawings as appropriate.

In the present embodiment, a configuration, in which the present invention is applied to a chain saw to cut a tree, a plate, or the like, will be described as an example. In the following description, a cutting part of the chain saw is on the front side with reference to the longitudinal (front-rear) direction, and a top handle thereof is on the upper side with reference to the vertical (up-down) direction.

Figure 1:
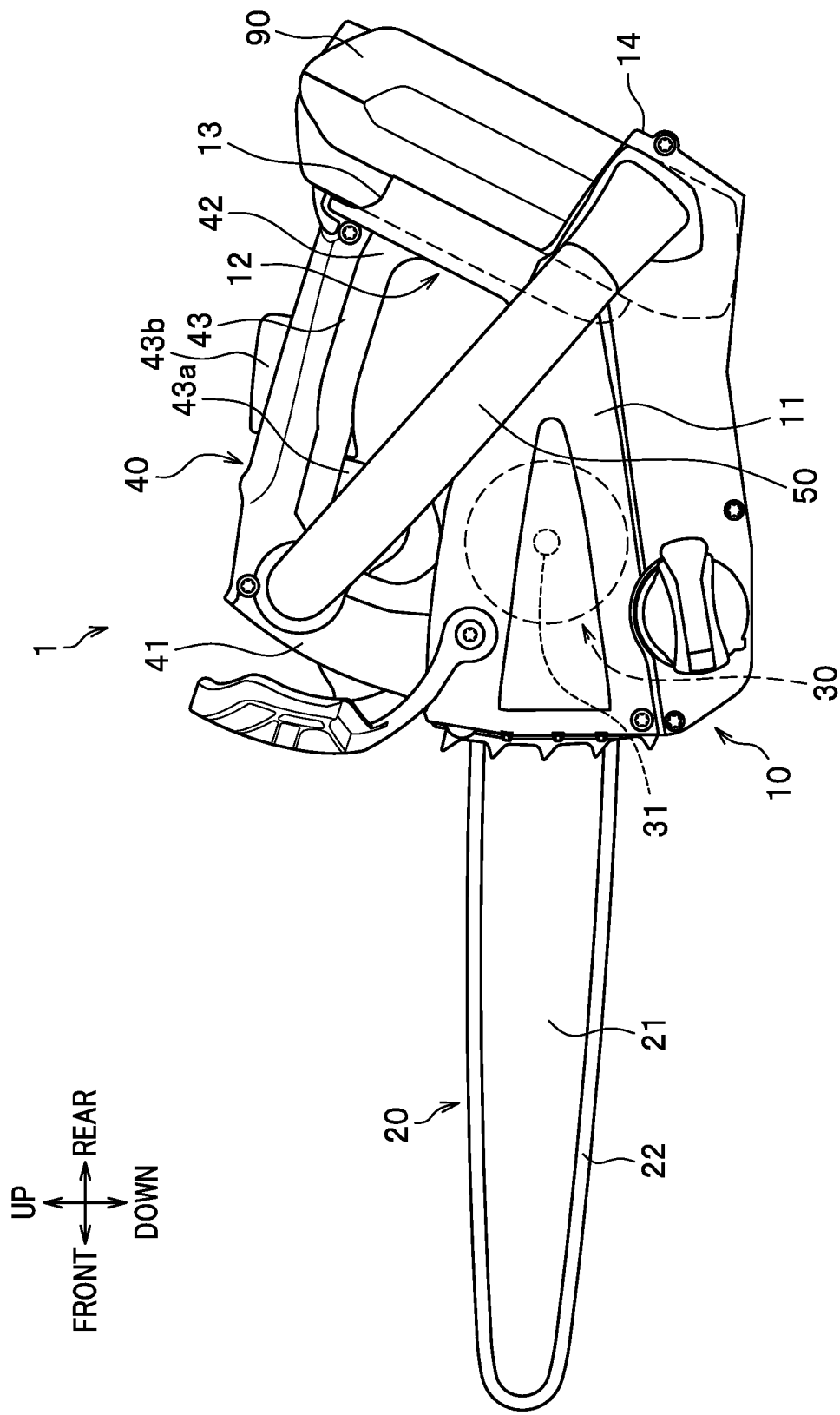
FIG. 1 is a side view of a chain saw according to an embodiment of the present invention.

As shown in FIG. 1, a chain saw 1 includes a body case 10, a cutting part 20 set to the body case 10, a motor 30 to drive the cutting part 20, and a battery 90. In the chain saw 1, the battery 90 attached to the body case 10 supplies power to the motor 30 so as to drive the cutting part 20.

Figure 3:
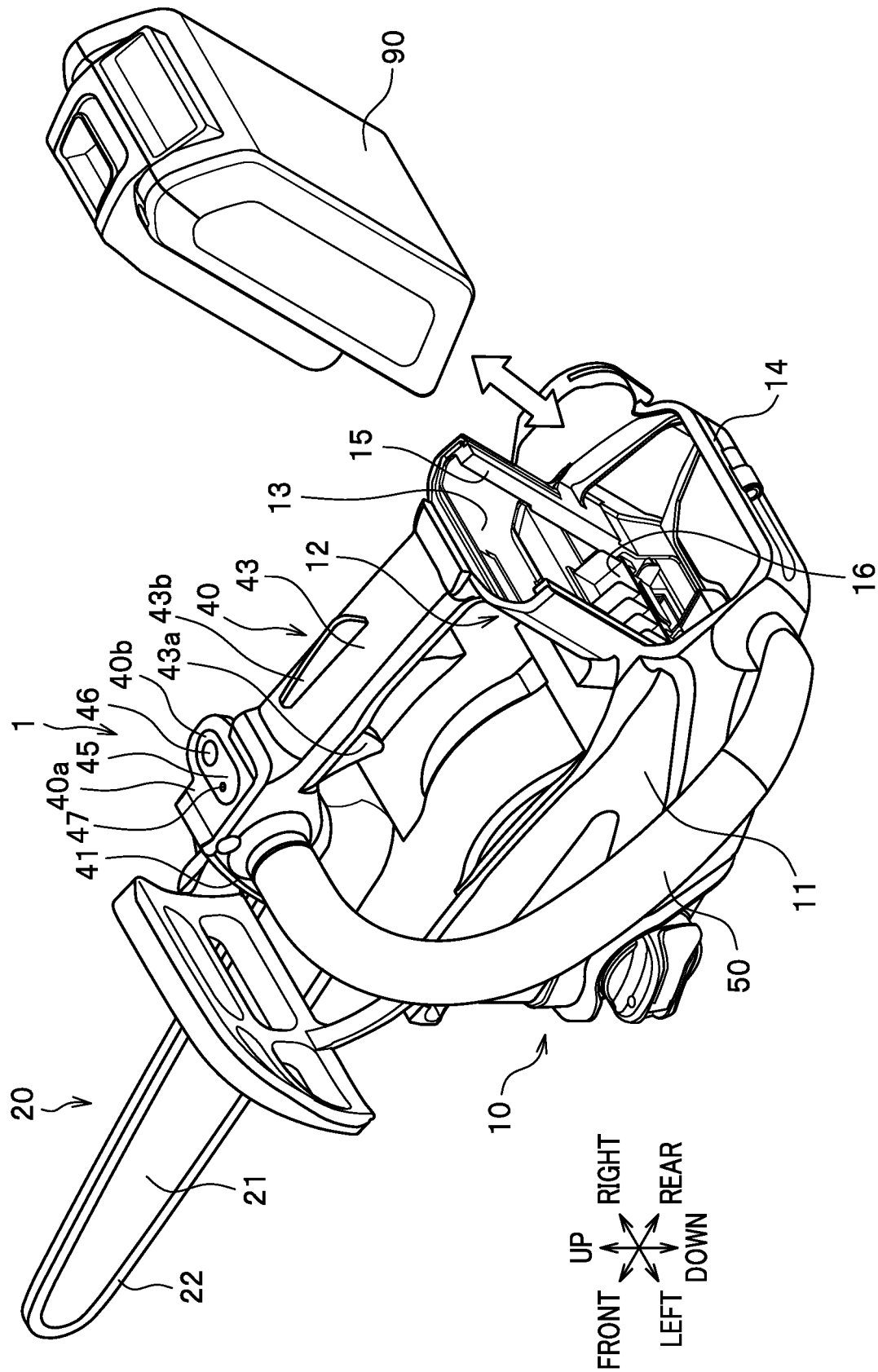
FIG. 3 is a perspective view of the chain saw, with a battery removed, according to the embodiment of the present invention.

As shown in FIG. 3, the body case 10 includes a body part 11 formed of a resin box, and a top handle 40 formed on the upper side of the body part 11. Thus, the top handle 40 is formed on an upper part of the body case 10. Further, a side handle 50 is attached to the left side surface of the body case 10.

As shown in FIG. 1, the motor 30 is accommodated in a front part of the body part 11. A battery attachment part 12, in which the battery 90 is detachably attached, and is formed in the rear part of the body part 11.

The motor 30 is a popular electric motor. An output shaft 31 of the motor 30 extends in the lateral direction.

In addition to the motor 30, a control board (not shown) to control the driving of the motor 30 and a drive mechanism such as a driving gear (not shown) coupled to the output shaft 31 of the motor 30 are accommodated in the front part of the body part 11.

The battery attachment part 12 is formed on the rear end surface of the body part 11. The battery attachment part 12 includes a holding part 13 to hold the battery 90 and a battery case 14 to accommodate a lower part of the battery 90.

The holding part 13 is formed to have a rear end part of the body part 11 and a part in a plate shape extending upward from the rear end part of the body part 11. The holding part 13 is inclined such that a lower part thereof is located forward with respect to an upper part thereof. As shown in FIG. 3, the rear surface of the holding part 13 is an inclined surface which is gradually displaced forward as extending from the upper end to the lower end.

The holding part 13 is provided, on the rear surface thereof, with an attachment/detachment mechanism 15 to attach or detach the battery 90. The attachment/detachment mechanism 15 includes guide members through which the battery 90 is fitted in the vertical direction and a support member (not shown) to support the battery 90 from below.

When the battery 90 is mounted in the holding part 13, the battery 90 is slid downward along the attachment/detachment mechanism 15 to mount the battery 90 in the holding part 13 as shown in FIG. 1.

The battery 90 is a popular battery, having a rechargeable battery such as a lithium ion storage battery accommodated in a rectangular parallelepiped case extending in the vertical direction, as shown in FIG. 3.

As shown in FIG. 1, the battery 90 is formed to have a height higher than that of the rear part of the body part 11. The battery 90 of the present embodiment is formed larger than a battery accommodatable in the body case 10. The battery 90 has a sufficiently high power and charging capacity suitable for operation.

In a state where the battery 90 is mounted in the holding part 13, the battery 90 is arranged in the body case 10 such that the longitudinal direction of the battery 90 corresponds to the height direction of the body case 10. Further, the battery 90 mounted in the holding part 13 is formed larger than the rear part of the body part 11. The battery 90 is arranged in the vertical direction to stride across a central part in the height direction of the rear part of the body part 11. The upper end of the battery 90 protrudes above the rear end of the top handle 40.

Further, the holding part 13 includes an ejection mechanism (not shown) to be used for removing the battery 90 from the battery attachment part 12. While the battery 90 is mounted in the holding part 13, a lever provided on an upper part of the battery 90 is manipulated to activate the ejection mechanism, to push up the battery 90.

Still further, as shown in FIG. 3, the holding part 13 includes a metal connection terminal 16 on the rear surface thereof. The connection terminal 16 is electrically connected to the control board and the motor 30 (see FIG. 1). Once the connection terminal of the battery 90 is connected to the connection terminal 16 of the holding part 13, the battery 90 supplies power to the control board and the motor 30.

As shown in FIG. 1, the battery case 14 is formed at a lower end part of the battery attachment part 12. The battery case 14 is a cylindrical part to accommodate the lower part of the battery 90. The lower part of the battery 90 is inserted into the battery case 14.

Figure 2:
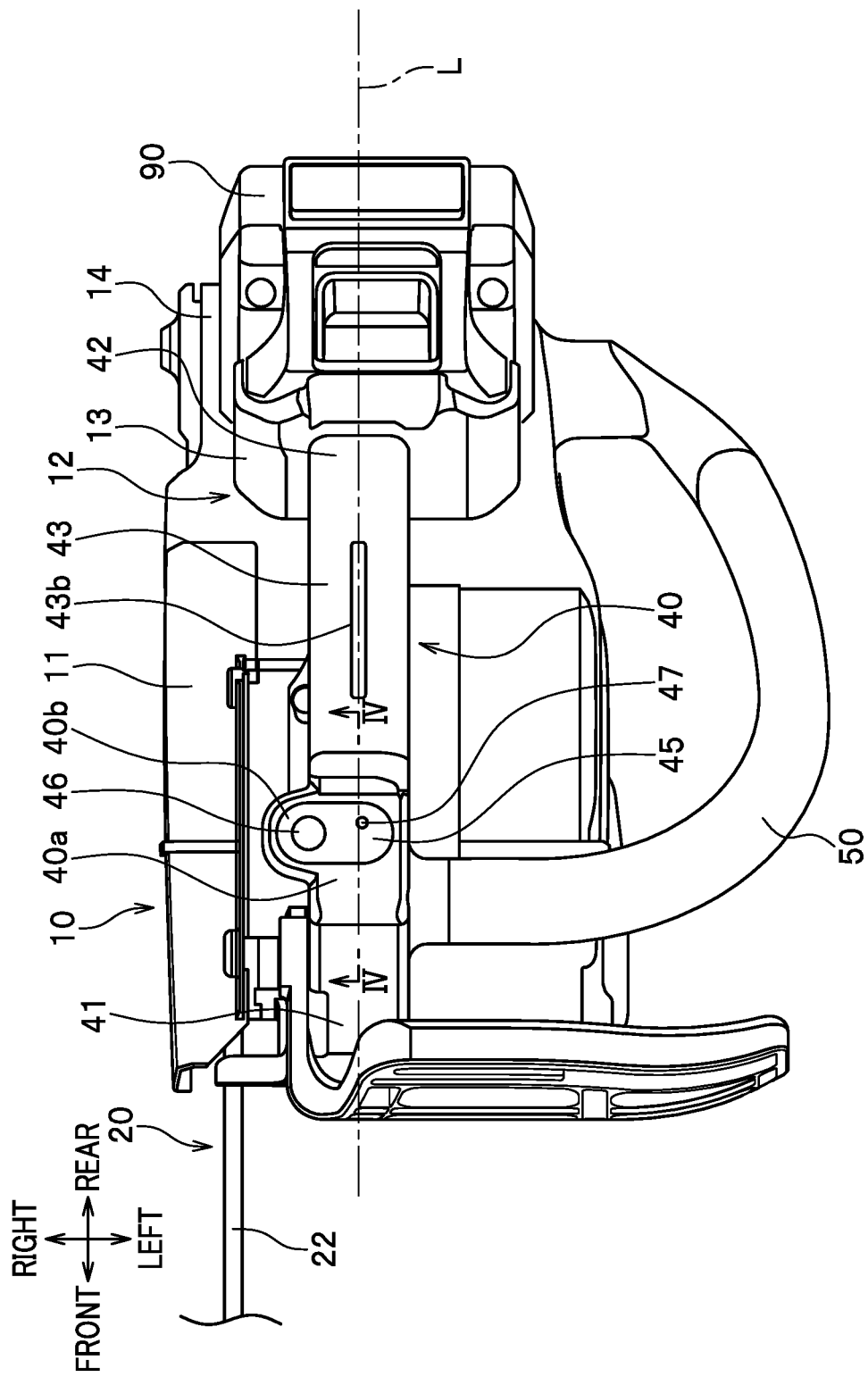
FIG. 2 is a plan view of the chain saw according to the embodiment of the present invention.

As shown in FIG. 2, the body part 11 is set up, on a right side part thereof, with the cutting part 20 protruding forward. The cutting part 20 is a work tool for cutting operation and includes a guide bar 21 and a saw chain 22.

The guide bar 21 is a member in a plate shape extending in the longitudinal direction, and a rear end part of the guide bar 21 is attached to the right side part of the body part 11.

The saw chain 22 in an annular shape is wound around the outer periphery of the guide bar 21. A rear end part of the saw chain 22 is engaged with the drive gear coupled to the output shaft 31 of the motor 30.

When the motor 30 is driven to rotate the drive gear (not shown), the saw chain 22 rotates along the outer periphery of the guide bar 21.

As shown in FIG. 1, the top handle 40 is formed to continue to the upper surface of the body part 11 and extends in the longitudinal direction above the body part 11.

The top handle 40 includes a front end part 41 protruding upward from a front end part of the upper surface of the body part 11.

The top handle 40 includes a rear end part 42 coupled to an upper end part of the holding part 13 of the battery attachment part 12. In a state where the battery 90 is mounted in the holding part 13, the upper end part of the battery 90 protrudes above the rear end part of the top handle 40.

The top handle 40 includes a gripping part 43 extending in the longitudinal direction between the front end part 41 and the rear end part 42. The gripping part 43 is slightly inclined obliquely downward as extending from the front end part 41 toward the rear end part 42.

The gripping part 43 is a part to be gripped by the operator when the operator holds the chain saw 1. The operator puts the hand into a space between the gripping part 43 and the upper surface of the body part 11.

The gripping part 43 includes a trigger lever 43a as operating part to increase or decrease the rotation speed of the saw chain 22 and a lock release lever 43b to unlock the trigger lever 43a, in a state where the operator grips the gripping part 43.

As shown in FIG. 3, the side handle 50 extends in the longitudinal direction from a front part to a rear part on the left side surface of the body case 10. The side handle 50 is formed of a bent columnar member.

A front end part of the side handle 50 is attached on the left side surface of the front end part 41 of the top handle 40. A rear end part of the side handle 50 is positioned rearward and downward with respect to the output shaft 31 of the motor 30, and is attached on the left side wall of the battery case 14.

The side handle 50 is curved between the front end part and the rear end part thereof to bulge outward with respect to the left side surface of the body case 10 (see FIG. 2).

As shown in FIG. 2, the chain saw 1 of the present embodiment includes a thumb rest 45, a power switch 46, and an indicator light 47 on the upper surface of the front end part 41 of the top handle 40.

Figure 4:
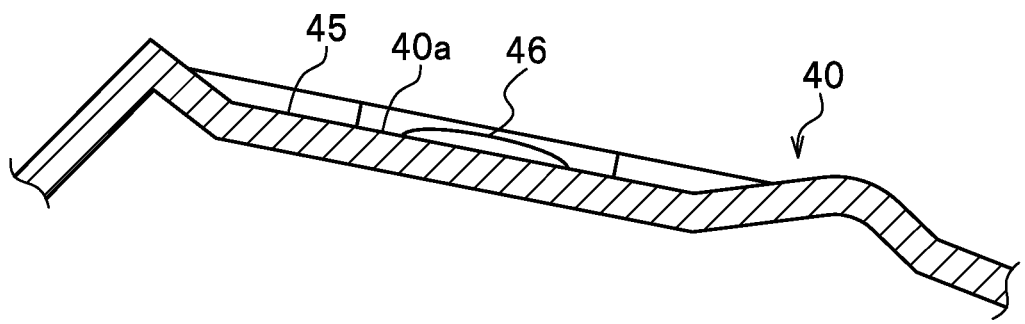
FIG. 4 is a cross-sectional view of a thumb rest and a power switch in the chain saw, taken along a line IV-IV in FIG. 2, according to the embodiment of the present invention.

The thumb rest 45, the power switch 46, and the indicator light 47 are arranged on a recessed surface 40a formed on the upper surface of the top handle 40. The recessed surface 40a is slightly recessed with respect to the upper end surface of the gripping part 43 (see FIG. 4). Further, the recessed surface 40a includes a protruding part 40b protruding rightward with respect to the right side surface of the gripping part 43.

The thumb rest 45 is an area on which the pad of the thumb of the right hand is placed when the operator grips the gripping part 43 with the right hand. The thumb rest 45 is arranged on a longitudinal axis L running through the center in the lateral direction of the gripping part 43.

The power switch 46 is a push-button switch to make the motor 30 (see FIG. 1) drive in an on-state and make the driving of the motor 30 stop in in off-state. The power switch 46 is formed to have a circular shape in plan view, and slightly protrudes with respect to the recessed surface 40a (see FIG. 4). The power switch 46 is switched on and off every time the power switch 46 is pushed down.

When the power switch 46 is pushed in a state where the driving of the motor 30 is stopped so as to be in an on-state, the battery 90 supplies power to the control board (not shown), to change to a state where the driving of the motor 30 is on standby. Then, when the trigger lever 43a is pulled in a state where the lock release lever 43b is being pushed down, the battery 90 supplies power to the motor 30 through the control board so that the motor 30 is driven.

When the power switch 46 is pushed in a state where the motor 30 is being driven so as to be in an off-state, the power supply to the motor 30 is interrupted and the driving of the motor 30 is stopped.

The power switch 46 is arranged side by side on the right side of the thumb rest 45. The power switch 46 is arranged on the protruding part 40b of the recessed surface 40a. Thus, the power switch 46 is arranged at a position protruding onto the opposite side (right side) of the side handle 50 (left side) with respect to the top handle 40.

The indicator light 47 is a light emitting diode (LED) arranged in the thumb rest 45. The indicator light 47 indicates the on/off state of the power switch 46. The indicator light 47 is turned on when the power switch 46 is in an on-state and is turned off when the power switch 46 is in an off-state.

When an object to be cut, such as a tree or a plate, is cut with the chain saw 1 as shown in FIG. 1, the operator grips the gripping part 43 of the top handle 40 with the right hand, and grips the side handle 50 with the left hand to carry the chain saw 1.

When the operator grips the gripping part 43 of the top handle 40 with the right hand, the lock release lever 43b is pushed down with the palm, and the lock of the trigger lever 43a is released. Further, the operator places the pad of the thumb of the right hand, with which the gripping part 43 is gripped on the thumb rest 45 in FIG. 2 so that the operator can stably hold the top handle 40.

Next, the operator shifts the thumb of the right hand to the right to push the power switch 46 so as to be in an on-state. Accordingly, the indicator light 47 is turned on, and the driving of the motor 30 is on standby.

The pad of the thumb of the right hand is then returned to the thumb rest 45, and when the trigger lever 43a is pulled up with the index finger of the right hand, as shown in FIG. 1, the motor 30 is driven to rotate the saw chain 22. As a result, the object to be cut can be cut with the saw chain 22.

The operator can cut the object to be cut while placing the thumb on the thumb rest 45 during operation. In this case, depending on the operation situation, the operator lightly places the thumb on the thumb rest 45 and grips the gripping part 43 to perform the cutting operation while stably gripping the gripping part 43, or pushes the thumb rest 45 with the thumb so as to push the object to be cut to stably perform the cutting operation.

When the operation needs to be stopped, the trigger lever 43a is returned to stop the driving of the motor 30, and then the thumb of the right hand is shifted to the right to push the power switch 46 so as to be in an off-state. Further, when the operation needs to be urgently stopped, the power switch 46 is pushed with the thumb of the right hand so as to be in an off-state, without the trigger lever 43a returned. Consequently, the driving of the motor 30 is stopped.

As shown in FIG. 1, in the chain saw 1 (electric power work device) as described above, the battery 90 in a large shape is detachably attached to the rear end part of the body case 10. Further, the top handle 40 extending in the longitudinal direction is formed on the upper part of the body case 10. The thumb rest 45, the power switch 46, and the indicator light 47 are arranged on the upper surface of the front end part 41 of the top handle 40. The power switch 46 is arranged on the right side of the thumb rest 45.

In the chain saw 1 according to the present embodiment, when the operator grips the gripping part 43, the operator places the pad of the thumb on the thumb rest 45 to stably grip the top handle 40. Further, the motor 30 is accommodated in the front part of the body case 10 and the battery 90 in a large shape is attached to the rear part thereof, to allow the chain saw 1 to be well-balanced in weight in the longitudinal direction. Therefore, the handling of the chain saw 1 is improved during operation, to improve working efficiency.

In the chain saw 1 of the present embodiment, the thumb rest 45 is arranged on the longitudinal axis L running through the center in the lateral direction of the gripping part 43. In the configuration, when the operator grips the gripping part 43 and places the pad of the thumb on the thumb rest 45, the thumb is extended along the longitudinal axis L, to allow the operator to stably grip the top handle 40.

In the chain saw 1 of the present embodiment, the operator can switch on/off the power switch 46 with the thumb while gripping the top handle 40. Therefore, after the operator switches off the power switch 46 to stop the motor 30 while gripping the top handle 40 during operation, the operator can switch on the power switch 46 while gripping the top handle 40 to resume the operation promptly.

In this case, the power switch 46 is arranged near the thumb rest 45. Therefore, even if the operator switches off the power switch 46 by mistake during operation, the operator can push the power switch 46 again while gripping the top handle 40 to continue the operation.

As described above, in the chain saw 1 according to the present embodiment, the operator can stably grip the top handle 40 and can switch on/off the power switch 46 while holding the chain saw 1 with both hands. Therefore, with the chain saw 1 of the present embodiment, the operator can work smoothly, to improve working efficiency.

In the chain saw 1 of the present embodiment, the power switch 46 is arranged on the side of the thumb rest 45, to have the length in the longitudinal direction of the top handle 40 decreased. As a result, the entire chain saw 1 is reduced in size.

In the chain saw 1 of the present embodiment, the power switch 46 is a push-button switch, so that the operator can easily manipulate the power switch 46 with only the thumb while gripping the gripping part 43.

Note that the chain saw 1 of the present embodiment is configured to include the gripping part 43 so as to be gripped with the right hand of the operator, and the power switch 46 is arranged on the right side of the thumb rest 45. It is more difficult to shift the thumb of the right hand gripping the gripping part 43 toward the right side than toward the left side, to allow for preventing the power switch 46 from being manipulated by mistake.

In the chain saw 1 of the present embodiment, the thumb rest 45 and the power switch 46 are arranged on the recessed surface 40*a* formed on the upper surface of the top handle 40. Therefore, the operator can move the pad of the thumb on the recessed surface 40*a* to sense the position of the power switch 46 (see FIG. 4).

Preferably, the power switch 46 may protrude slightly upward with respect to the recessed surface 40*a*. With this configuration, the operator can easily sense the position of the power switch 46, and when switching off the power switch 46, the operator cannot switch off the power switch 46 without moving the thumb upward. Therefore, the power switch 46 is prevented from being manipulated by mistake.

In the chain saw 1 of the present embodiment, the indicator light 47 is arranged in the thumb rest 45, to indicate the on/off state of the power switch 46. Therefore, the operator can accurately grasp the state of the power switch 46, to improve safety.

In the chain saw 1 of the present embodiment, the battery 90 is mounted in the battery attachment part 12 such that the longitudinal direction of the battery 90 corresponds to the height direction of the body case 10. In the configuration, the center of gravity of the battery 90 can be positioned more on the front side even if the battery 90 is increased in size in the height direction, as compared with a case where the longitudinal direction of the battery 90 is oriented in the lateral direction. Therefore, the handling of the chain saw 1 having the battery 90 in a large shape is improved during operation, and the chain saw 1 is reduced in size.

In the chain saw 1 according to the present embodiment, the upper part of the battery 90 mounted to the battery attachment part 12 protrudes above the rear end part of the top handle 40, and the battery 90 is inclined so as to be separated rearward from the gripping part 43. In the configuration, even if the battery 90 is elongated in the vertical direction, the operator is not disturbed by the upper part of the battery 90 when gripping the gripping part 43. Therefore, the battery 90 can be made larger without reducing the operability of the chain saw 1.

The embodiment of the present invention has been described above, but the present invention is not limited thereto and can be appropriately modified within the scope of the present invention.

As shown in FIG. 2, in the chain saw 1 of the present embodiment, the power switch 46 is arranged on the right side of the thumb rest 45, but may be arranged on the left side of the thumb rest 45.

In the chain saw 1 of the present embodiment, the thumb rest 45 and the power switch 46 are arranged on the recessed surface 40*a* of the top handle 40, but may be arranged on the upper surface of the top handle 40, without the recessed surface 40*a*.

In the present embodiment, the chain saw 1 applied with the present invention has been described. However, an electric power work device applicable with the present invention is not limited to a chain saw, and the present invention is applicable to various electric power work devices such as a brush cutter, a hedge trimmer, and a blower.

What is claimed is:

1. An electric power work device comprising:
   a body case;
   a work tool protruding forward from a front side with respect to the body case;
   a motor driving the work tool; and
   a battery supplying power to the motor,
   wherein the motor is accommodated in the body case and the battery is detachably attached to a rear side with respect to the body case,
   a top handle is extended in a longitudinal direction at an upside with respect to the body case,
   the top handle includes, on an upper surface of a front part thereof, a thumb rest and a power switch which drives the motor in an on-state and stops the motor in an off-state;
   the top handle includes a gripping part; and
   the thumb rest is an area on which a pad of a thumb is placed when an operator grips the gripping part and is arranged on a longitudinal axis running through a center in a lateral direction of the gripping part, and the power switch is arranged on a side in a lateral direction of the thumb rest, side by side with the thumb rest.

2. The electric power work device as claimed in claim 1, wherein the power switch is a push-button switch.

3. The electric power work device as claimed in claim 2, wherein the thumb rest and the power switch are arranged on a recessed surface formed on an upper surface of the top handle.

4. The electric power work device as claimed in claim 1, wherein the body case includes, on a left side surface, a side handle extending in the longitudinal direction, and the power switch is arranged on a right side of the thumb rest.

5. The electric power work device as claimed in claim 1, wherein the thumb rest includes an indicator light to indicate an on/off state of the power switch.

* * * * *